UNITED STATES PATENT OFFICE.

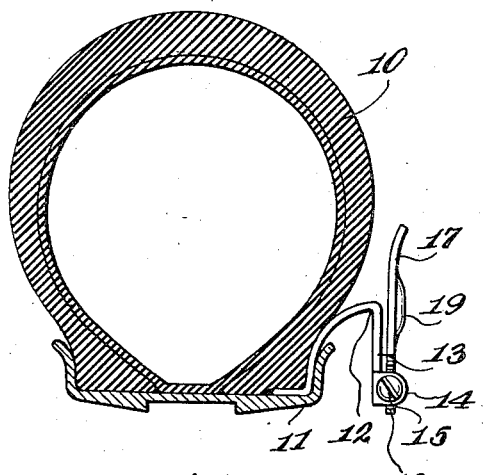
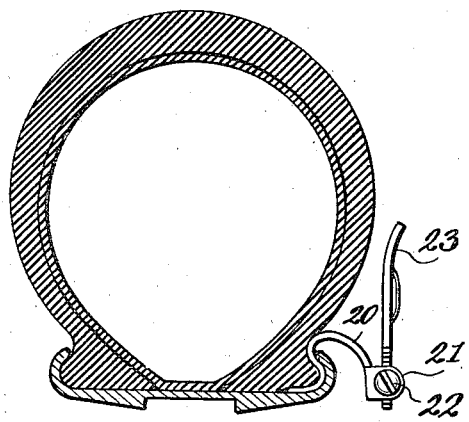
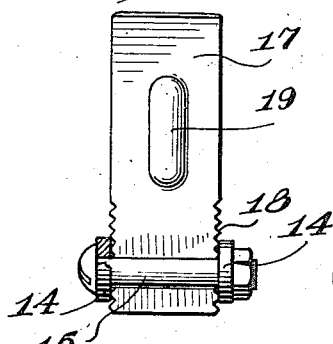
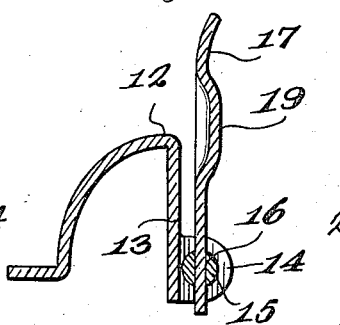
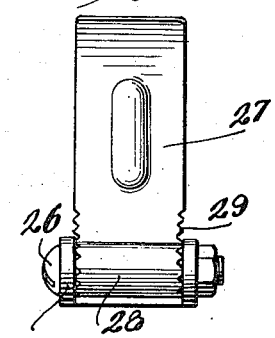
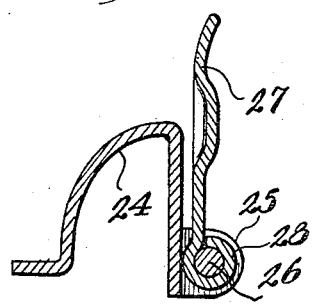
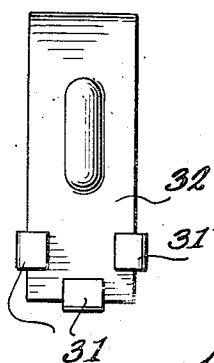
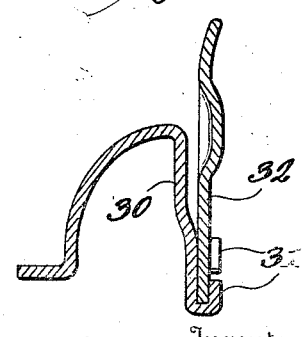

HAL H. CLARKE, OF OKLAHOMA, OKLAHOMA.

TIRE SIGNAL.

1,409,360.  Specification of Letters Patent.  Patented Mar. 14, 1922.

Application filed June 21, 1921. Serial No. 479,286.

*To all whom it may concern:*

Be it known that I, HAL H. CLARKE, a citizen of the United States of America, and resident of Oklahoma city, in the county of Oklahoma and State of Oklahoma, have invented certain new and useful Improvements in Tire Signals, of which the following is a specification.

This invention relates to alarms for indicating the deflated state of a pneumatic tire, the said invention having for its object the provision of novel means applicable to a tire rim, and adapted to sound an alarm which will indicate that the tire is in a state of deflation, a condition which indicates the tire is not properly supporting the load, and this device is intended to operate when the pressure in the tire is decreased to a point where the sides of the tire are flexing to too great an extent, or where the tire utterly collapses as occurs when there is a puncture or blow-out.

A still further object of this invention is to produce a tire alarm of the character indicated which may be used in connection with tires having straight rims or with those of the clincher type, the purpose of the invention being to produce an alarm of the character indicated which can be used on the different types of rims and in connection with tires differing in contour and size.

A still further object of this invention is to produce a tire alarm which will be comparatively inexpensive to produce.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a sectional view of a rim and tire of the straight side type having a device embodying the invention applied thereto;

Figure 2 illustrates a similar view showing the invention applied to a tire of the clincher type;

Figure 3 illustrates a face view of the said alarm mechanism;

Figure 4 illustrates a sectional view thereof;

Figure 5 illustrates a face view of a modified construction;

Figure 6 illustrates a sectional view thereof;

Figure 7 illustrates a face view embodying a modified construction; and

Figure 8 illustrates a sectional view thereof.

In these drawings 10 denotes a tire of the straight side type, 11 the rim and 12 a bracket adapted for use in connection with the rims and tires of the type shown in Fig. 1, the said bracket being of such irregular contour as to conform to the joint between the tire and the rim, and the said bracket is shown as extending outwardly from the rim, terminating in an angularly disposed portion 13, which, in the position of the parts shown in Fig. 1, would be regarded as downwardly extending, but the description of position is a relative one and depends upon the position of the wheel and the point at which the attachment is placed. However, for convenience in description, the term "downwardly" is employed. In reality, the angularly disposed portion at the outer end of the bracket preferably extends toward the hub of the wheel to which the rim was applied.

The angularly disposed portion 13 in the embodiment of the invention shown in Figs. 1 to 6, has outstanding parallel ears 14 on its edges at the end, and these ears are apertured to receive a bolt 15 provided with a longitudinally disposed slot 16 forming a seat for the signal plate 17. The signal plate has a slight outward curve at the outer end, and its inner end may project to a greater or less extent through the slot of the bolt where it may be held in different positions of adjustment. The edges of the plate are serrated as shown at 18 to increase the frictional engagement of the parts and hold the said plate in operative position with relation to tires of different diameters. The plate is pressed outwardly, as at 19, and this is intended to produce a flexing action resembling a popping noise intended to act as an alarm to warn the operator that the tire is in engagement with the plate. The plate may be held at different positions of adjustment by reason of the fact that the bolt may be turned to cause the plate to project at different angles with relation to the bracket.

In that form of the invention shown in Fig. 2, the bracket 20 extends outwardly and it terminates in ears 21 having a bolt 22 which is slotted in the manner heretofore described in connection with the disclosure of the bolt 15, and a signal plate 23 having the characteristics of the signal plate 17 is applied to the bolt and secured in place in all respects, as in this embodiment of the invention, like the one illustrated in Fig. 1.

The modifications shown in Figs. 5 and 6 may be employed in connection with the bracket for the straight side tire or for the clincher tire type, but instead of employing a bolt having a slot, a bracket 24 which may be of the configuration of the bracket 12 or 20, has ears 25 to receive a bolt 26, and in this form, the signal plate 27 terminates in an eye 28 which receives the bolt, and by which the ears are clamped against the edges of the signal plate or the eye thereof. The signal plate 27 and the eye are serrated as shown at 29, for the purpose of increasing the frictional engagement of these parts with the surfaces of the ears in order that the plate may be retained in different positions of adjustment.

In that form of the invention shown in Figs. 7 and 8, a bracket 30, which is here conventionally shown, may be of the type for use in connection with tires having straight sides or clincher type, but in this form of the invention, the bracket has wings 31 formed integral therewith, preferably projecting from the sides and end adapted to be bent to embrace the edges of the signal plate 32, the said signal plate having a construction similar to that heretofore shown, except that the serrated edges are omitted.

The parts of the device shown in Figs. 7 and 8 can be so shaped as to closely clamp the signal plate to the bracket, and this form of the device can be made wholly by the stamping process, a condition which results in minimizing the expense of production.

I claim:

1. In a tire signal, a bracket adapted to be secured to a rim of a tire, said bracket having ears, a slotted bolt in the said ears, and a signal plate anchored in the said slotted bolt and clamped between the ears thereby.

2. In a tire signal, a bracket adapted to be attached to a rim of an automobile wheel, the said bracket having apertured ears, a slotted bolt in the apertures of the ears, a signal plate having its end adjustably anchored in the slotted bolt, the said signal plate having serrations at its edge for engagement with the ears, and an outwardly curved portion formed integral with the said plate.

3. In a signal for tires, a bracket having a configuration at one end adapted to fit the contour of a bead of a tire rim and to be clamped between the rim and a casing of a tire, and a signal plate connected to the said bracket and adapted to extend approximately radially to engage the side of the said casing.

HAL H. CLARKE.